H. H. CUMMINGS.
APPARATUS FOR MEASURING THE TWIST OF SHAFTS.
APPLICATION FILED NOV. 22, 1911.
1,227,043.
Patented May 22, 1917.
4 SHEETS—SHEET 1.
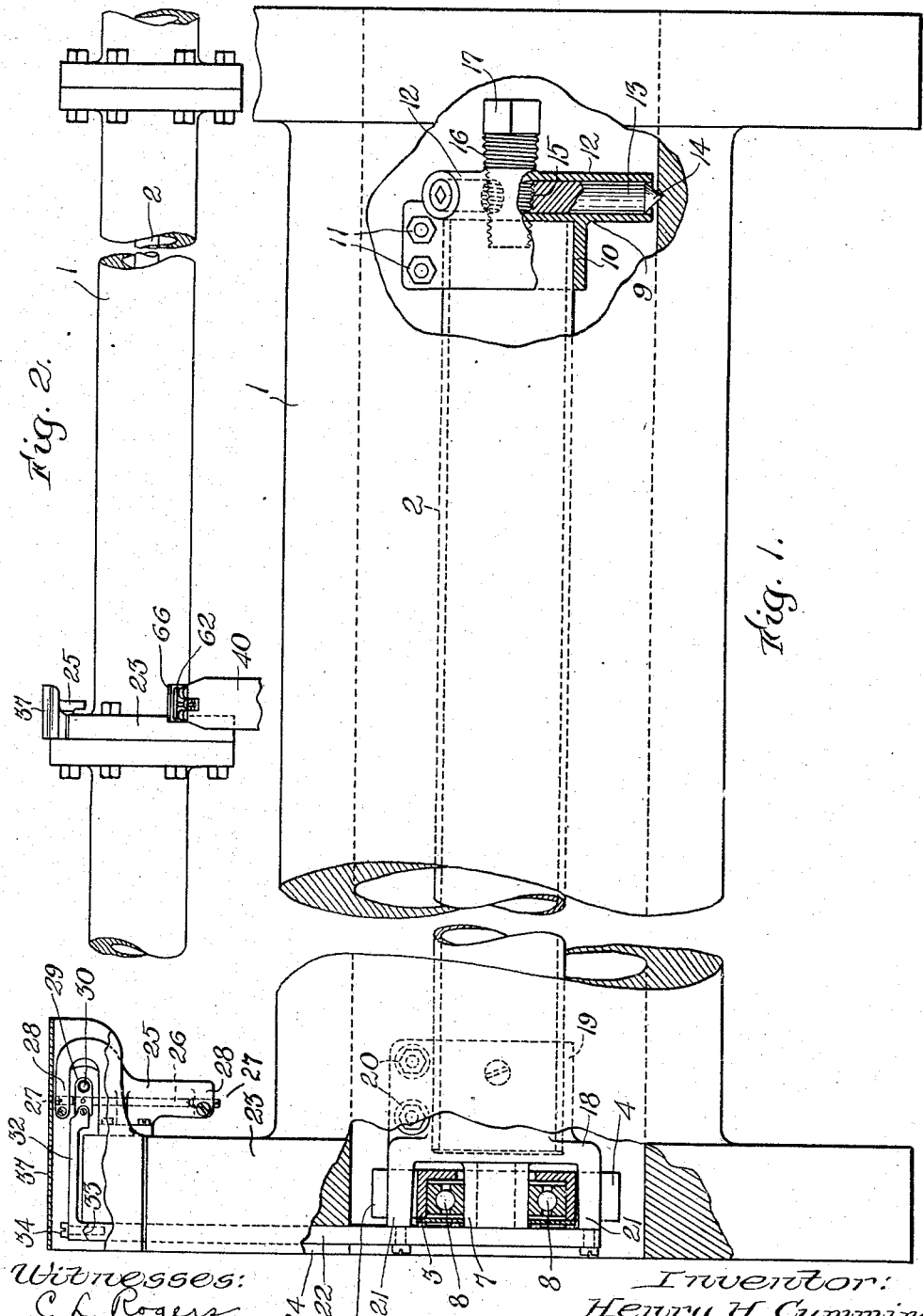

H. H. CUMMINGS.
APPARATUS FOR MEASURING THE TWIST OF SHAFTS.
APPLICATION FILED NOV. 22, 1911.
1,227,043.
Patented May 22, 1917.
4 SHEETS—SHEET 2.
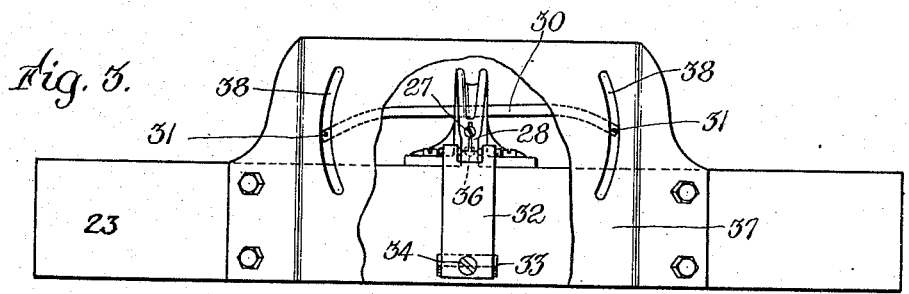
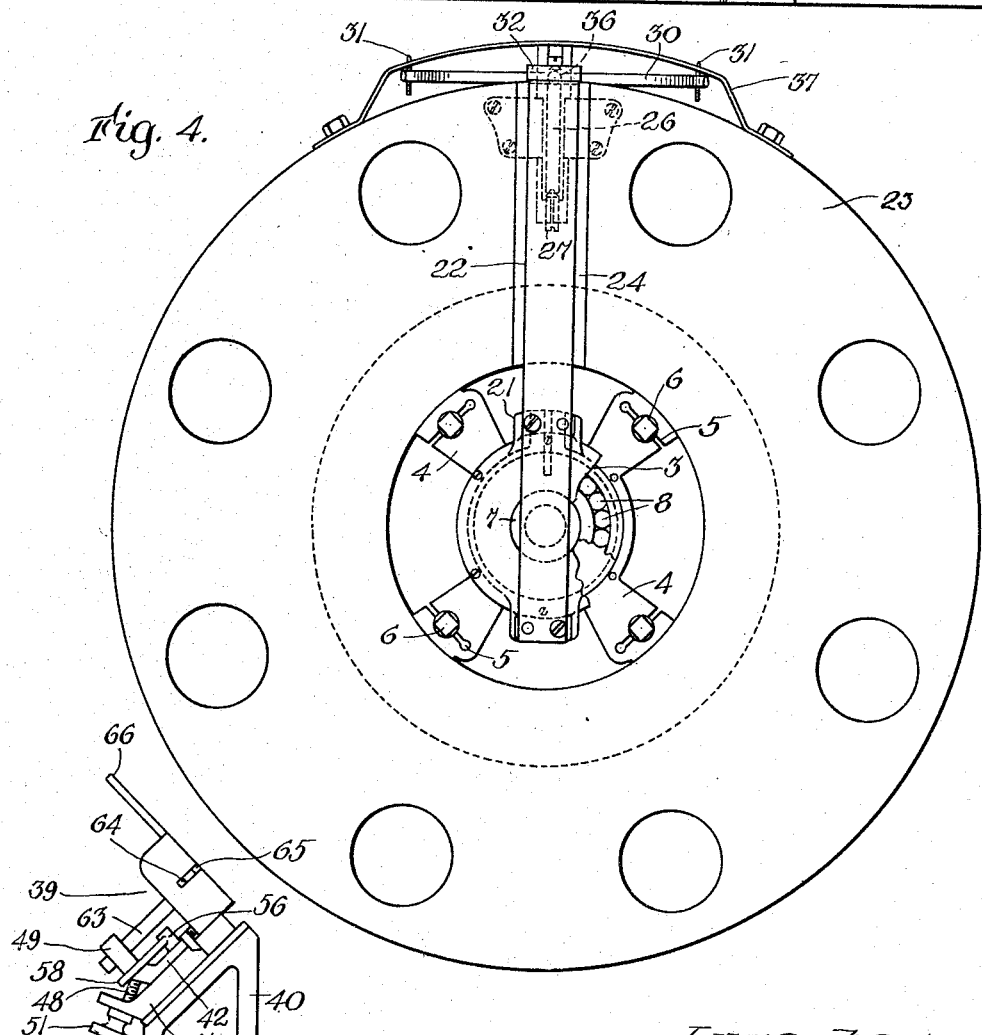

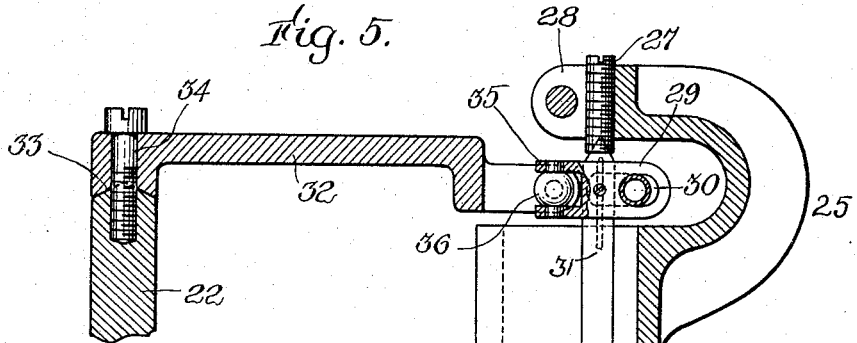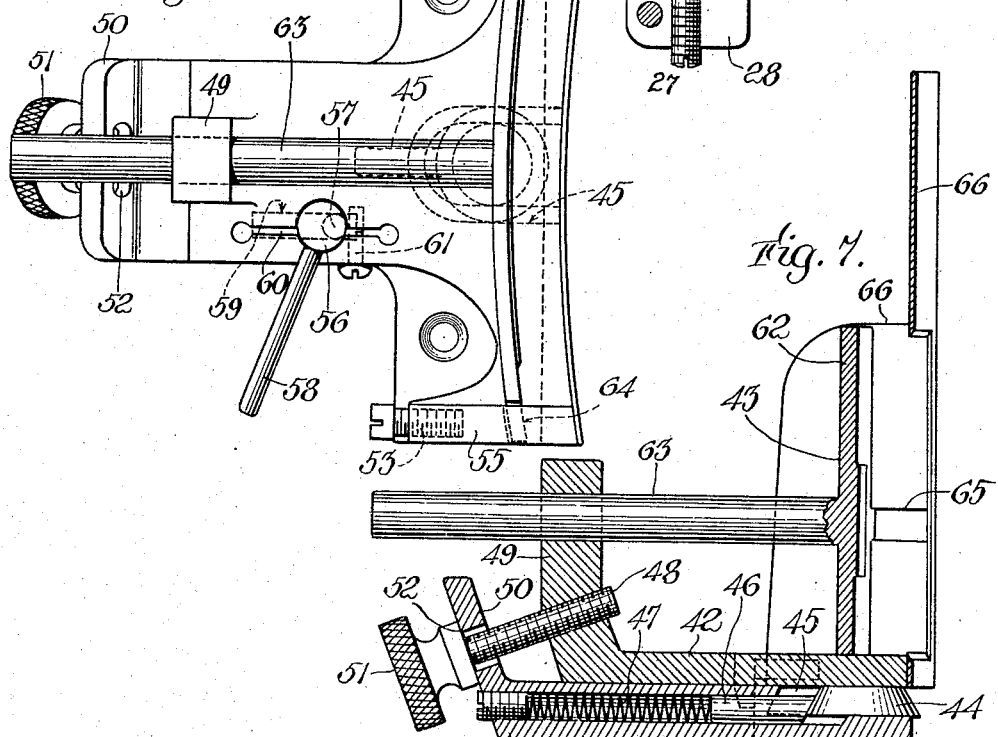

H. H. CUMMINGS.
APPARATUS FOR MEASURING THE TWIST OF SHAFTS.
APPLICATION FILED NOV. 22, 1911.
1,227,043.
Patented May 22, 1917.
4 SHEETS—SHEET 4.
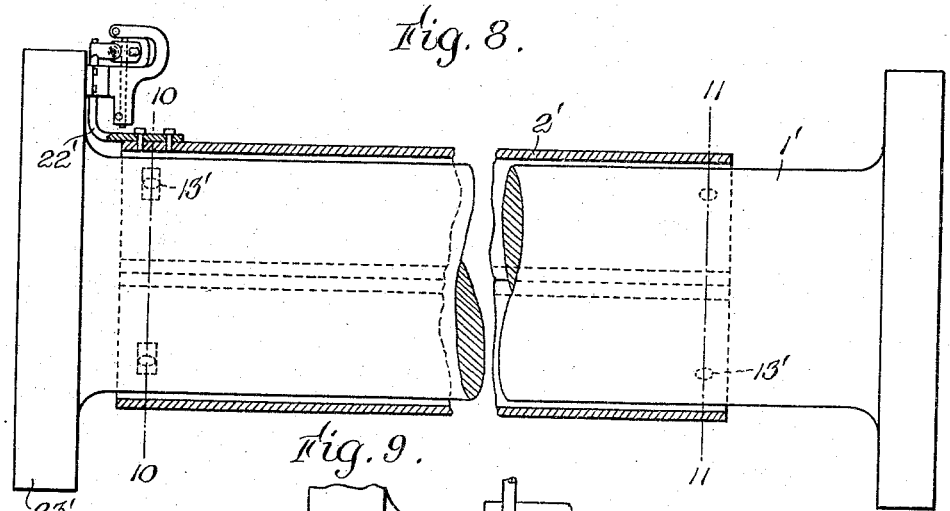
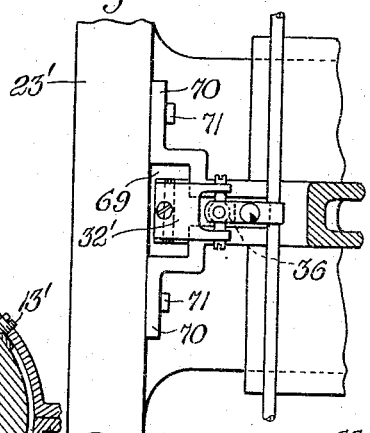
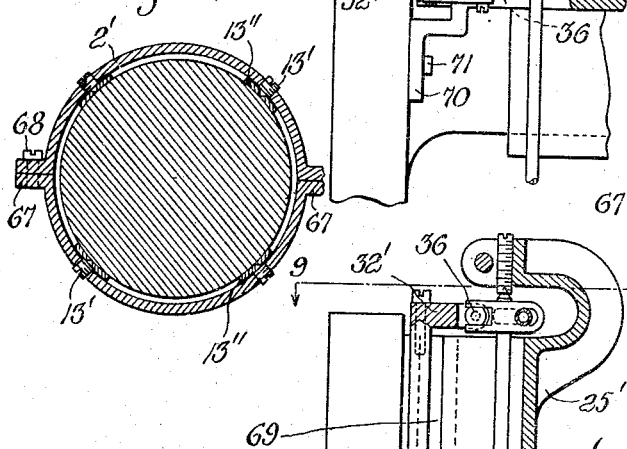
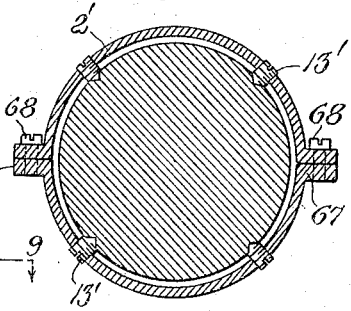
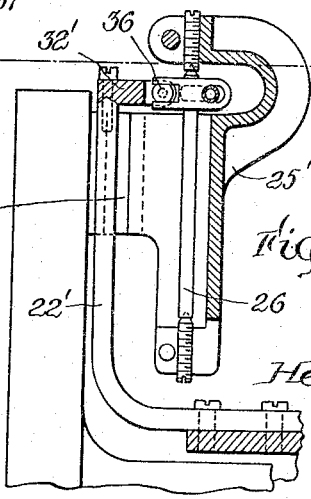
Witnesses:
C. L. Rogers
R. G. Hersey
Inventor:
Henry H. Cummings
by
Geo. H. Maxwell,
Attorney.

UNITED STATES PATENT OFFICE.

HENRY H. CUMMINGS, OF NEWTON HIGHLANDS, MASSACHUSETTS, ASSIGNOR OF ONE-HALF TO HOWLAND R. GARY, OF ALEXANDRIA, VIRGINIA.

APPARATUS FOR MEASURING THE TWIST OF SHAFTS.

1,227,043.  Specification of Letters Patent.  Patented May 22, 1917.

Application filed November 22, 1911. Serial No. 661,796.

*To all whom it may concern:*

Be it known that I, HENRY H. CUMMINGS, citizen of the United States, and resident of Newton Highlands, county of Middlesex, and State of Massachusetts, have invented an Improvement in Apparatus for Measuring the Twist of Shafts, of which the following description, in connection with the accompanying drawings, is a specification, like numerals on the drawings representing like parts.

The present invention relates to improved means for measuring the power delivered by a driving motor to a part to be driven by means of the elastic distortion resulting in the power transmitting connections, and while having other and more general fields of usefulness, is well adapted for measuring the power impulse transmitted from the turbines to the propeller or propellers in turbine driven ships. I have discovered that by taking advantage of the almost perfectly elastic quality of the high grade steel employed in the transmission shafting, wherein the elastic twisting distortion of an integral section of such shafting is always substantially the same, (within the elastic limits of the metal) for a given amount of power transmission, an accurate torsion meter can be associated with and operated from an integral shafting section without interfering with the normal operation thereof for transmission of power and without requiring any of the complicated and cumbersome devices hitherto involved in measuring power transmission. My improved meter consists in a device having operative attachment at separated points to the transmission shafting, with connections arranged for coöperative action to indicate with precision and exactness the amount of elastic twist distortion present at any given time in the portion of the shafting between such points. More specifically, in one preferred embodiment, the invention consists in a device adapted to be housed nearly in its entirety in the hollow center of the transmission shafting commonly used, with only the immediate recording elements extending without the shafting, thus disposing of the device so as to be entirely out of the way and effectually protecting its parts from injury.

The invention will be better understood from the following detailed description, taken in connection with the accompanying drawings, and will be thereafter pointed out in the appended claim.

Referring to the drawings,

Figure 1 is a side elevation partly in section and broken away, of a section of power transmission shafting with my improved torsion meter fitted thereto.

Fig. 2 is a broken away elevation, showing a part of a power transmission shafting line with one shaft section thereof fitted with my improvements.

Fig. 3 is a side or edge view, and Fig. 4 is an end elevation partly broken away, of the flanged end of a shaft section equipped with my improvements.

Fig. 5 is a detail sectional view of the transmission connection to the recording device.

Fig. 6 is a plan.

Fig. 7 is a central vertical section of a holder for the record sheet.

Fig. 8 is a view partly in section and partly in elevation, and with a portion broken away, of a modification.

Fig. 9 is a fragmentary detail of such modification taken on line 9—9 of Fig. 12.

Figs. 10 and 11 are transverse sections on lines 10—10 and 11—11 respectively of Fig. 8; and Fig. 12 is an enlarged fragmentary detail partly in section through the recording elements of such modified form.

While not limited thereto in its broader aspects, my improved torsion meter and recording device is shown by Figs. 1 to 4 in a preferred embodiment as applied to an integral section 1 of the hollow shafting commonly employed for the transmission of power from the turbine or other motor to the propeller or other part to be driven. These integral shaft sections are usually of considerable length, commonly about twenty feet, and I preferably attach the coöperative connections of my improved device as near to the ends of the sections as possible, in order to take advantage of as long a range of elastic distortion as can be had. Within the hollow center of the selected shaft section a shaft 2 is mounted, preferably tubular for the sake of lightness. This shaft is mounted at one end in a bearing spider 3, having a series, shown as four, of spaced apart arms 4 extending radially to engage the inner wall periphery of shaft section 1 at one end thereof. This spider support is adapted to be immovably held at or adjacent one end of shaft section 1 by having the arms 4 provided with transverse cuts 5 extending well across the same, so that the outer ends thereof may be forced out by expansion bolts 6 to grip the walls of the shaft section. As shown, the shaft 2 has a reduced end 7 fitted in ball bearings 8 carried by the spider support 3, and extends thence substantially the entire length of shaft section 1 to an anchor support 9. This support has a split collar 10 adapted to be rigidly clamped to the shaft 2 by clamp bolts 11 and is provided with a series, shown as three, of spaced apart guide bearings 12 for radially slidable anchor pins 13, having their outer ends pointed, as seen at 14 to bite into the shaft section 1. The inner ends of these pins have screw threads 15 formed thereon adapted to be engaged by coöperating threads on a conical expanding screw bolt 16, this screw bolt having its outer end 17 squared or otherwise formed to receive an operating tool. Thus, with the collar 10 rigidly clamped to the shaft 2 and with the anchor pins 13 forced outward to bite into the walls of shaft section 1, it is apparent that this end of the shaft 2 is held fixed relative to the shaft section 1, so as to turn in unison therewith. The other end of shaft 2 adjacent its reduced bearing portion 7 has clamped thereon a bracket 18, having a split collar 19 clamped to the shaft 2 by screw bolts 20.

The bracket 18 has opposite projections 21 extending outward beyond the bearing spider 3 and passing between the arms 4 with sufficient play between said arms for limited angular movement. These projections have fixed thereto an arm 22 extending radially of the shaft and out to the periphery of the end flange 23 of shaft section 1. As seen in Figs. 2 and 4, this arm is housed within flange 23, this flange for this purpose having a radial slot 24 in its end, somewhat wider than the arm 22 so as to permit the small angular movement of said arm involved in the operation of the recording device. The flange 23 has fixed at its inner side, near its periphery, a bracket support 25 for the recording members, and in this bracket a rock-shaft 26 is mounted on cone bearing screws 27 shown as adjustably clamped in split portions 28 of the bracket. This shaft has fixed thereto a holder 29 in which a bar or rod 30 is centrally fixed with oppositely extending portions which carry at their ends the recording stylus or other marker points 31. As seen in Figs. 3 and 5, the bar 30 is bent around at either side so that the marker points 31 carried at its ends are in alinement with the center of shaft 26 about which it turns. The holder 26 is connected with radial arm 22 for operation thereby. For this purpose the arm 22 has a bar 32 rigidly connected therewith by an interlocking connection 33 held clamped by a screw bolt 34, and this bar extends over the edge of flange 23 for connection with a projection 35 from holder 29. The extremities of bar 32 and projection 35 are forked and are connected by a universal joint 36, so that transverse movements of the bar 32 from angular turning of arm 22 are transmitted to effect a turning of holder 29 on its axis, and hence a corresponding swinging of the stylus carrying bar 30. The pivotal connection 36 is comparatively close to the shaft axis 26, and hence a small movement imparted thereto will cause a considerable displacement of the stylus points 31 since they are at a relatively great distance from the shaft axis. The flange 22 has fixed thereto a shield or cover plate 37 which is bowed out to extend over the bar 30 and has arcuate slots 38 arranged to permit play of the stylus points 31 therein, these points projecting through the cover 37, as seen in Fig. 4.

The stylus points 31 thus carried by the flange 22 of a shaft section are adapted to make recording marks on a record sheet held in their path of movement on a suitable fixed support. For this purpose a record sheet holder, designated generally 39 is mounted on a suitable fixed support 40. The holder 39 comprises a base member 41 rigidly fixed to the support 40, an intermediate bracket member 42 adjustable relative to the base 41, and a record sheet carrier proper 43 manually movable on the bracket 42. The bracket 42 has a depending under cut portion 44 circular in cross-section and fitted for limited sliding movement in a corresponding undercut way 45 in the base 41, and a follower block 46 slidable in the base 41 and pressed by spring 47 engages against the portion 44 and tends to move the bracket 42 forward, or to the right, in Fig. 7. This movement of the bracket is adjustably limited by a screw bolt 48 threaded through an upstanding projection 49 of bracket 42 and extending through a slot in a projection 50 upstanding from the base 41. This screw bolt has an enlarged operating head 51, a shoulder 52 of which is adapted to engage the projection 50, thus serving as a stop to limit the forward movement of the bracket 42 under the influence of spring 47. Thus the bracket 42, with the record sheet carrier 43 thereon, is adapted to be adjusted forward by manipulation of the knurled head 51. To prevent casual turning of this head so that the bracket 42 would be adjusted so far forward that the stylus points, or other record marker might be injured from too close engagement, I preferably provide adjustable stops in the form of screw bolts 53 with beaks 54 threaded into lateral projections 55 of the bracket 42, the beaks 54 being adapted to extend downward in position to engage corresponding laterally projecting portions of the base 41 at a point so that this engagement prevents the bracket 42 from moving too far forward. It is desirable that provision be made for small angular adjustments of the record sheet, so that the two stylus points will press evenly on the record sheet in their different positions of recording movement, and the undercut portion 44 of the bracket 42 is made circular in cross section to permit this. To effect this angular adjustment, a turning plug 56 having an eccentric pin 57 and a handle 58 projecting therefrom is journaled in the bracket 42, the pin 57 working in a lengthwise slot 59 in the base 41 so that as the handle 58 is turned, the pin 57 engaging the side of said slot causes an angular displacement of bracket 42 relative to the base 41. The bracket 42 is slotted, as seen at 60, for some distance at either side of the bearing of plug 56, and a screw bolt 61 is passed transversely through this portion in position, when set up, to clamp the bearing walls of plug 56 against it, and thus hold it fixedly in position.

The record sheet carrier proper 43 consists in a plate 62 fixed to a rod or bar 63 slidably mounted on the bracket 42, the rod 63 having bearing in the upstanding projection 49 and adapted to be pressed forward by the hand to bring the sheet carried thereby into engagement with the stylus points. The plate 62 is curved transversely, as seen in Fig. 6, in conformity with the angular sweep of the stylus points about axis 26 and reduced extremities 64 of this plate are guided in ways 65 formed in a casing 66, which extends around said plate and forward to its limit of forward adjustment, and shown with a top extension 66 to facilitate slipping of the record sheet down into position, and to protect the operator from accidental injury.

In use, the parts are so adjusted that as the power transmitting shaft turns without elastic distortion from power transmission, the two stylus points 31 move in nearly the same path over a record sheet held by the sheet holder, making lines near together on the record. As soon, however, as twisting distortion of the shaft section 1 commences, there will be a slight angular displacement between the flange 23 and the other end portion of shaft 1 to which the tubular shaft 2 is rigidly fixed. This distortion results in a small turning of shaft 2 relative to the flange 23, and thus the arm 22 with bar 32 carried thereby, is moved correspondingly relatively to the recorder axis shaft 26, whereby the bar 32 through the pivotal connection 36 causes a turning of shaft 26, and thus a swinging of the stylus carrying rod 30, moving the stylus points, one farther to one side of the lines and the other farther to the other side of the other line previously traced. Thus the stylus or other marker points 31, in the rotation of the power transmission shaft, will now make marks wider apart than the marks before produced, and as the extent of separation of these marks bears a definite and exact relation to the power transmission which is causing the distortion of the transmission section 1, it follows that a table can be readily prepared, whereby the amount of power being transmitted can be read from the record sheets as thus marked by the recording device. In practice, the record sheets may be suitably graduated so that this reading is facilitated.

It is to be observed that the measuring and recording device thus constructed, is adapted to be installed in connection with the ordinary power transmission shafting line from the turbines, or other power source, to the propellers or other parts to be driven, with its operative parts completely housed and taking up practically no additional space. Further, that the device is of extremely simple construction, having no complicated parts apt to get out of order and likewise very light and compact. The shaft 2, which is considerably the largest single element of the device, can be made tubular as shown, with relatively thin walls, since it is only required to transmit the small impulse necessary to work the recording device; thus the weight of the entire mechanism is an almost negligible quantity. A further important point is that practically no modification of the transmission shaft section 1 in which the device is installed is required, the illustrative embodiment shown only requiring the shallow radial slot 24 in the face of flange 23, and very small threaded holes in its periphery.

In Figs. 8 to 12 a modified form of the invention is shown, adapted for use with solid shafting. In this case a sleeve 2' is fitted over an integral shaft section 1' extending for the greater part or the whole of the length thereof and fixedly fastened to the shaft section at one end by anchor pins 13' threaded therethrough and having points to bite into the shaft, the other end of said sleeve having spaced apart bearing plates adjustable by others of the pins 13' so as to have a properly centered and easy bearing fit on the shaft. The sleeve 2' may be of relatively thin light stock, since it is only required to transmit the small impulse for moving the recording devices, and, in practice, this sleeve is preferably made in two halves clamped together by ears 67 with which clamp bolts 68 engage, this divided construction enabling the sleeve to be quickly and easily fitted to the shafting.

The sleeve 2′ extends to a point adjacent an end flange 23′ of the shaft section and this end has fixed thereto an arm 22′ bent up alongside flange 23′. This flange has fixed thereto near its periphery a bracket support 25′ having cone bearing screws supporting the rock-shaft 26, which, with the stylus carrying bar and stylus points, may be formed precisely the same as in the first described form of the invention. The arm 22′ is connected with rock-shaft 26 by a bar 32′ through a swivel joint 36, this bar being similar in its form and function to bar 32, except that as it does not span the flange it is shorter. As shown, the arm 22′ passes through a recess 69 in the bracket support 25′, this being large enough to permit the small angular movement of the arm required, the bracket support being fixed to the shaft flange by ears 70 extending at either side thereof and clamped to the shaft flange as by screw bolts 71. It will be understood that this form of the invention operates in precisely the same manner as the first described form, the sleeve 2′ transmitting to the recording device the movement of the shaft section at one end thereof, while the other coöperative elements of the recording device fixed at the other end of the shaft section to the flange 23′ coöperate with the arm connection 22′ from the other end of the sleeve to record with precision the variations in twist distortion of the shaft portion between.

Other forms, modified more or less according to the requirements of special kinds of transmission shafting may be devised without departing from the spirit of the invention, and I am also well aware that numerous changes can be made in details of construction, for example, in the character and arrangement of the transmitting connections between the separated portions of shaft section 1, and in the coöperative relation between these for the purpose of effecting the recording movement of the stylus or other marker points. I therefore desire the particular embodiments of the invention shown to be understood as illustrative and not restrictive. The present illustrative constructions are not necessarily the preferred form of the invention, broadly considered, but are the preferred forms of this application.

Having described my invention, what I claim as new and desire to secure by Letters Patent is:

An apparatus of the kind described, comprising a hollow power shaft section, a recording device mounted thereon adjacent one end thereof, and a connection for operating said recording device for the purpose stated, including a member mounted within said shaft section remote from said recording device with radially expansible anchor pins for biting into the shaft section, and a central expander for operating the same.

In testimony whereof, I have signed my name to this specification, in the presence of two subscribing witnesses.

HENRY H. CUMMINGS.

Witnesses:
C. L. ROGERS,
H. R. GARY.

Copies of this patent may be obtained for five cents each, by addressing the "Commissioner of Patents, Washington, D. C."